Patented Aug. 14, 1951

2,564,506

UNITED STATES PATENT OFFICE 2,564,506

SEPARATION OF SIDE-CHAIN HALOGENATED ALKARYL COMPOUNDS

Benjamin B. Schaeffer, Niagara Falls, N. Y., assignor to Mathieson Chemical Corporation No Drawing. Application September 8, 1948, Serial No. 48,332

1 Claim. (Cl. 260—650)

This invention relates to a method for separating alkaryl compounds containing one or more side-chain halogen atoms from mixtures thereof with aromatic compounds free of side-chain halogen atoms but having an unsaturated hydrocarbon side chain. More particularly, it comprises the reacting of such side-chain halogenated contaminants of vinyl aromatics with an organic amine and the separating of the reaction products from the vinyl aromatic.

The method is particularly valuable as applied in the separation of such alkaryl compounds from vinyl aromatic compounds which may or may not contain nuclear halogen atoms. Thus, it can be applied with excellent results in the separation of chloroethyl benzene from styrene, for example, or in the separation of chloro-isopropyl benzene from alpha methyl styrene or in the separation of chloroethyl dichlorobenzene from dichlorostyrene.

Nuclear dichlorostyrenes, for instance, which are readily polymerizable to plastics having great commercial utility, are conveniently produced by the dehydrohalogenation of haloethyldichlorobenzene. Though styrene is much less readily polymerized and its polymers have much lower distortion temperatures than dichlorostyrenes and their polymers, it is likewise of considerable commercial utility. Styrene may be prepared by dehydrohalogenation of a haloethylbenzene. However, the reaction mixture resulting from the dehydrohalogenation in either case invariably contains substantial amounts of unreacted starting material. As compounds containing side-chain halogen adversely affect the rate and extent of polymerization, it is necessary to subject the dehydrohalogenation product to a treatment resulting in the removal of as much of the chloroethyl compound, for instance, as possible. A large proportion of the offending compound can be separated, of course, by fractional distillation, but in order to meet product specifications it is frequently necessary to carry the distillation treatment beyond commercially practicable limits. Even small amounts of the chloroethyl compound, having little, if any, effect on the polymerization of the styrene or dichlorostyrene, are objectionable where the polymeric material is to be employed in a molding operation carried out at elevated temperatures since it has been found that polymers prepared from monomers containing such amounts of the chloroethyl compound are prone to evolve hydrogen chloride during such operations causing corrosion of the equipment, particularly the metal parts thereof.

The process of the present invention is, as above noted, characterized by the adding to the contaminated vinyl aromatic material of an organic amine, the reacting of the added amine with the side-chain halogen-containing contaminant at a relatively low temperature, and separating the reaction product from the mixture. It is especially applicable to prefractionated vinyl aromatics containing not in excess of 1% of the contaminant.

It has previously been proposed to use organic amines for the purpose of dehydrohalogenating aromatic compounds containing chlorine in a suitable side chain having at least two carbon atoms for the production of vinyl aromatic compounds. Usually such reactions require a high temperature and they have sometimes been performed in the liquid and sometimes in the vapor phase. By this or other methods, the reaction to form the desired vinyl aromatic has been incomplete, and even under the best conditions, residual unreacted starting material containing side-chain chlorine has remained in the product. In view of that fact, it was not to be expected that minor amounts of side-chain halogen contaminants remaining in prefractionated vinyl aromatics could be removed, especially at relatively low temperatures, by the processes of the present invention.

While I do not wish to be bound by any theory as to why my process is effective, it may be that the added amine reacts with the side-chain halogen compound by addition. For instance, when primary or secondary amines are used, the reaction may be one of simple addition between the halide contaminant and the added amine. When the added reagent is a tertiary amine, the reaction may perhaps form quaternary ammonium compounds. I remove the reaction products from the vinyl aromatic not by thermal decomposition, as suggested by the prior art in the manufacture of such vinyl aromatic compounds, but by washing with water or dilute alcohol, or by adsorption. By the process of the present invention, it is possible to remove minor amounts of such contaminants to such an extent that no objectionable quantities of hydrohalogen acid are liberated when the polymerized vinyl aromatic is molded.

Organic amines generally have been found suitable for use in the present invention including primary, secondary and tertiary amines of the aliphatic series, as well as basic heterocyclic and aromatic amines. Examples of such amines which may be used with particular advantage are tetraethylenepentamine, tribenzylamine, dicyclohexylamine, octadecyldimethylamine, lauryldimethylamine, piperazine, pyridine, morpholine, morpholine sulfide and homologues of these compounds.

As little as the theoretical amount of the amine may be added to the contaminated vinyl aromatic mixture, based on the side-chain halogen content thereof, and providing one mole of amine for each atom of halogen present in that form in the mixture. It is advantageous to add considerably more than the theoretical amount of the amine in order to permit effective removal of the contaminant at a lower temperature and in a shorter time. As much as an equal volume of amine may be admixed with the vinyl aromatic to obtain particularly thorough removal of the contaminant under mild conditions. However, it is advantageous to avoid the use of such large proportions of amine. As the invention is usually practiced on prefractionated vinyl aromatics containing less than about 0.1% of side-chain halogen by weight, I generally prefer to use from about .5% to 5% of the amine on the weight of the vinyl aromatic.

The amount of side-chain halogen present in the vinyl aromatic mixture, for instance, in dichlorostyrene, may be determined as follows: a weighed sample of about 10 milliliters of the contaminated dichlorostyrene is admixed in a hundred milliliter flask with 10 milliliters of absolute ethanol. 10 milliliters of N-alcoholic potash is added and the mixture is refluxed for about 16 hours. The contents of the flask are then washed into an Erlenmeyer flask with hot water and neutralized to phenolphthalein using 30% acetic acid. Potassium chromate indicator solution is then added and the mixture titrated for chloride by the addition of standard silver nitrate solution. Ordinarily 0.1-N-silver nitrate is used, but for particularly low percentages of side-chain chlorine, 0.02-N or 0.05-N-silver nitrate may be preferred.

Where the desired proportion of amine does not completely dissolve in the vinyl aromatic, it may be desirable to agitate the mixture to obtain effective contact of the reactants. However, it is usually advantageous to add a small proportion of a lower molecular weight water-soluble aliphatic alcohol, for instance, methanol, ethanol, iso- or N-propanol, N-, iso- or tertiary butanol or tertiary amyl alcohol, in sufficient proportions to obtain a homogeneous solution. Other non-reactive mutual solvents which are soluble in water may be substituted, for instance, acetone, methyl ethyl ketone or acetonitrile.

Frequently the purification reaction proceeds satisfactorily at room temperature and the mixture of vinyl aromatic and amine may be allowed to stand for a short time or overnight or longer. If it is desired to complete the purification more rapidly, the temperature may be suitably elevated for example to 65–70° C. for from a few minutes to several hours. The reaction is, with advantage, carried out at a temperature not substantially lower than room temperature (about 18° C.) nor higher than 100° C. Finally, the reaction mixture is washed several times with water or dilute alcohol or dilute acid to remove the reaction product of the amine with the side-chain halogen contaminant from the vinyl aromatic. Where the side-chain halogen is initially low and not over 1% of the amine, based on the weight of the mixture, is added, it is feasible to omit the washing step and pass the mixture directly to an adsorption column. Under such conditions, preferably the mixture is passed directly, without intermediate washing, to an adsorption column and therein percolated through a bed of activated alumina by which the reaction product is preferentially adsorbed from the mixture. In place of the alumina, activated magnesia may be used.

Depending upon the amount of the contaminant present, it may be advantageous to wash a major portion of the reaction product from the mixture prior to the adsorption separation or in lieu thereof.

The treatment described may be repeated where it is desired to remove still further amounts of side-chain halogen containing contaminants of the vinyl aromatics. Where the reaction mixture has been washed with water to remove the reaction products, it is necessary to dry the vinyl aromatic, for example, by use of potassium carbonate or other suitable drying agent, for instance, caustic soda or potash, sodium sulfate, calcium chloride, anhydrous calcium sulfate, or anhydrous magnesium perchlorate. Where the adsorption column only is used to remove the reaction products, the monomer is ready to use after such treatment.

The practice of the invention is further illustrated by the following examples which, however, are not to be taken as in any way restrictive of the scope of the invention.

*Example I*

Mixed isomeric nuclear dichlorostyrenes were prepared by the nuclear chlorination of ethyl benzene and fractionation to produce ethyl dichlorobenzenes. Chlorination in the side chain and fractionation resulted in mixed isomers of chloroethyl dichlorobenzenes. Catalytic vapor phase demuriation of this mixture and fractionation of the product with suitable inhibitors resulted in mixed nuclear dichlorostyrenes containing 0.052% of side-chain chlorine. Equal volumes of this dichlorostyrene and morpholine were admixed at room temperature and chilled in a Dry-Ice box for a few minutes. On warming to room temperature a white crystalline reaction product remained undissolved and was removed by filtration. The oil was washed with water until neutral, dried and passed through a column of activated alumina. The product contained only 0.009% of side-chain chlorine indicating a removal of over 80% of the contaminating substances containing chlorine in this form.

*Example II*

Equal volumes of the same dichlorostyrene, dicyclohexylamine and isopropanol were admixed at room temperature and stirred for twenty minutes. Water was added to separate the oil which was then washed three times with a mixture of isopropanol and water. The amine was finally completely removed by several washes with 5% sulfuric acid. The neutral vinyl aromatic was dried with potassium carbonate and passed through activated alumina. The product contained 0.0025% of side-chain chlorine indicating a removal of 95% of the contaminant.

*Example III*

To 150 grams of mixed nuclear dichlorostyrenes containing 0.059% of side-chain chlorine there was added 1 gram of octadecyldimethylamine. The mixture was heated and stirred at 65–70° C.

for 1 hour, cooled and passed through a column of activated alumina. The resulting monomeric dichlorostyrene contained 0.004% of side-chain chlorine indicating removal of 93% of the contaminant.

In a similar treatment of another sample of dichlorostyrenes containing 0.021% of side-chain chlorine, only 0.002% remained after treatment with octadecyldimethylamine indicating a removal of approximately 90% of the contaminant.

*Example IV*

The procedure of the preceding example was repeated using 0.5 grams of piperazine and 150 grams of dichlorostyrene containing 0.059% of side-chain chlorine at 70° C. The side-chain chlorine of the purified monomer was 0.006 indicating a removal of about 90% of the contaminant.

Treatment of another sample of 150 grams of monomeric dichlorostyrenes containing 0.021% of side-chain chlorine with 0.2 grams of piperazine at 70° reduced the side-chain chlorine to 0.002%.

*Example V*

When 0.25 grams of morpholine sulfide was added to 150 grams of monomeric dichlorostyrene containing 0.059% of side-chain chlorine and the mixture heated for 1 hour at 65–70° C. followed by passage through a column of activated alumina, the purified monomer contained 0.009% of side-chain chlorine indicating a removal of about 85% of the contaminant.

0.25 grams of morpholine sulfide was used to treat 150 grams of monomeric dichlorostyrene containing 0.021% of side-chain chlorine by similar procedure. The resulting monomeric dichlorostyrenes contained 0.003% of side-chain chlorine indicating a removal of about 85% of the contaminant.

*Example VI*

150 grams of the mixed monomeric dichlorostyrenes containing 0.021% of side-chain chlorine was treated with 0.5 grams of lauryldimethylamine by allowing the mixture to stand at 25° C. for 1 hour followed by passage through a column of activated alumina. The resulting monomer contained 0.001% of side-chain chlorine indicating a reduction of 95% of the contaminant.

*Example VII*

A sample of mixed isomeric nuclear dichlorostyrenes was contaminated by the addition thereto of chloroethyldichlorobenzenes until the side-chain chlorine analysis of the monomer was 0.195%. A portion of this mixture was polymerized and a weighed sample of polymer subjected to a temperature of 200° C. for 4 hours while a stream of nitrogen was passed over the polymer. The evolved hydrogen chloride was absorbed in distilled water. The resulting acid solution was titrated with standard silver nitrate and reported in terms of per cent of hydrogen chloride evolved based on the polymer sample. The polymer containing 0.195% of side-chain chlorine showed a hydrogen chloride evolution of 0.1402%.

This contaminated monomer was treated by the addition of 2.1 grams of 2-amino pyridine per 200 grams of monomeric mixture and the whole maintained at 65–70° C. for 1 hour. The monomer was passed through a column of activated alumina and polymerized by the same procedure used for the untreated contaminated monomer. When tested for hydrogen chloride evolution by the same procedure, only 0.0219% of hydrogen chloride was evolved, about 15% of that evolved by the untreated contaminated monomer.

The process has been found to be especially useful and effective in the purification of nuclear dichlorostyrenes and, accordingly, the invention has been specifically illustrated with particular reference thereto. It is to be understood, however, that the invention is also applicable to the removing of alkaryl compounds containing side-chain halogen from other vinyl aromatics, notably styrene, paramethylstyrene, alpha, paramethylstyrene, parachlorostyrene, trichlorostyrenes and fluorostyrenes.

I claim:

A process for separating an alkaryl compound containing at least one side-chain halogen atom from a mixture thereof with an aromatic compound free from side-chain halogen but having an unsaturated hydrocarbon side chain, said mixture containing less than about 0.1% of side-chain halogen by weight, which comprises admixing at a temperature of from about 18 to not higher than 100° C. said mixture with from about 0.5 to about 5% of an organic amine selected from the group consisting of primary, secondary and tertiary amines, based upon the weight of said aromatic compound, to form an addition product of said halogen compound and said amine, and thereafter separating said addition product from the reaction mixture by directly passing the reaction mixture in contact with activated alumina.

BENJAMIN B. SCHAEFFER.

REFERENCES CITED

The following references are of record in the file of this patent:

Degering: "An Outline of Organic Nitrogen Compounds"; pages 202–3 (1945).